Dec. 4, 1951     E. LANGEN     2,577,135
DEVICE FOR EXTRACTION OF SUGAR FROM SUGAR BEET SLICES
Filed June 6, 1950
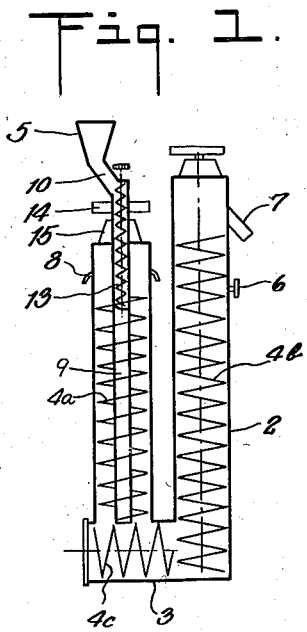
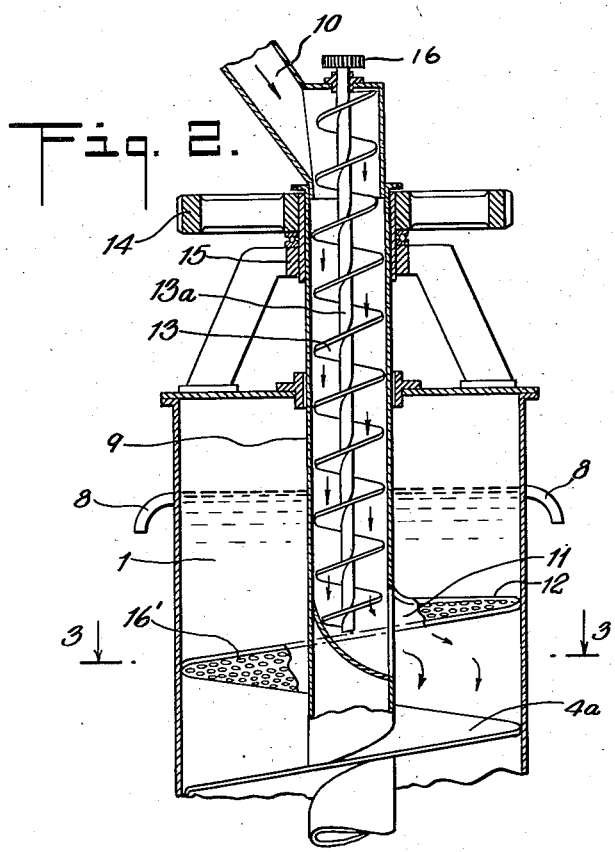
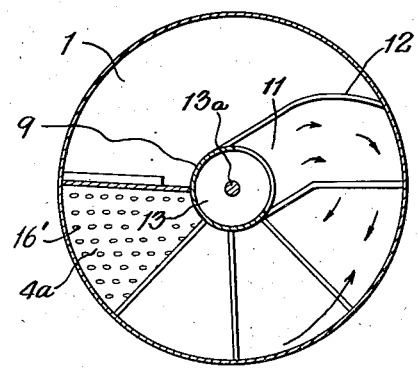
INVENTOR.
EUGEN LANGEN
BY
    HIS ATTORNEYS Patented Dec. 4, 1951

2,577,135

UNITED STATES PATENT OFFICE 2,577,135

DEVICE FOR EXTRACTION OF SUGAR FROM SUGAR BEET SLICES

Eugen Langen, Elsdorf, Germany, assignor to Pfeifer und Langen, Elsdorf/Rheinland, Germany Application June 6, 1950, Serial No. 166,347
In Germany June 13, 1949

14 Claims. (Cl. 127—7)

The present invention relates to improvements in devices for extracting sugar from sugar beet slices and relates more particularly, to an apparatus for feeding slices of sugar beets into an extraction apparatus.

An object of the present invention is to provide a device for feeding a steady flow of beet slices in a continuous manner and in regulated quantities in such a way that the slices do not pile up above the entry point or the supply become exhausted at various times during the extraction operation. Another object of the invention is to provide for the entry of the beets below the surface of the liquid in the extraction apparatus in such a way as to eliminate the need of special filters or strainers to separate the juices from the beets.

Other objects and advantages of the invention will be best understood from the following description and the accompanying drawings in which:

Fig. 1 is a vertical section view of an extraction device incorporating the present invention as a part thereof;

Fig. 2 is a vertical section view of a portion of one of the extraction towers of the device illustrated in Fig. 1 on an enlarged scale and showing the details of a feed device embodying the present invention; and Fig. 3 is a section view taken along the line 3—3 of Fig. 2.

Referring to the drawings in detail, the extraction device illustrated in Fig. 1 is of the same general type as that described and claimed in application Serial No. 62,912 filed December 1, 1948, in the name of Karl Wilhelm Hildebrandt and reference may be made thereto for a more detailed description of such apparatus. As shown in Fig. 1, such an apparatus generally has two vertical extraction towers 1 and 2 that are connected by a cross member or ground pipe 3. Conveyor screws 4a, 4b, and 4c are located within the towers 1 and 2 and the ground pipe 3, respectively, and are rotated therein in moving the beets through the towers 1 and 2 and the ground pipe 3. An extracting liquid enters the second tower 2 at an inlet 6 beneath a discharge port 7 at which exhausted beet slices leave the apparatus. The extracting liquid flows through the towers 1 and 2 and the ground pipe 3 in a direction countercurrent to the movement of the beet slices and the raw juices leave the first tower 1 at outlets 8 located at the upper end of the first tower 1.

In accordance with the present invention, the slices of beets are introduced beneath the surface of the liquid or raw juices in the first tower 1. For this purpose, the upper end of the shaft 9 on which the conveyor screw 4a is mounted in the first tower is made hollow, as seen best in Fig. 2 and is connected by a pipe 10 to a funnel 5 through which the slices of beets are supplied. A discharge opening or exit 11 is provided in the hollow shaft 9 at a point below the raw-juice outlets 8 and hence, below the level of the extracting liquid in the first tower 1. A baffle plate 12 extends from the opening 11 in the shaft 9 to the sides of the tower. The baffle plate 12 guides the slices emerging from the discharge opening 11 in the shaft 9 onto the conveyor screw 4a and into the first canal thereof.

Inside of the hollow shaft 9, a conveyor screw or worm 13 is carried by a shaft 13a. The conveyor screw or worm 13 extends from the point where the pipe 10 connects to the top of the hollow shaft 9 to the discharge exit or opening 11 in the hollow shaft. The conveyor screw 13 rotates in the hollow shaft 9 and controls the movement of the slices from the time they reach the hollow shaft until their entry onto the large conveyor screw or worm 4a. The movement of the slices of beets from their insertion into the hollow shaft to their entry into the large conveyor screw 4a is sealed-in and the suppressed or regulated flow of beet slices into the first extraction tower is done forcibly. The shaft 13a for the conveyor screw 13 in the hollow shaft 9 may be driven independently of the shaft 9 from a gear 16 so as to regulate the quantity of slices fed to the conveyor screw 4a thereby.

As shown best in Fig. 1, the hollow shaft 9 for the conveyor screw 4a is driven from a gear 14 secured to the end of the shaft extending outside of the tower and is also supported by a bearing 15 on the outside of the tower.

It is preferable that the first canal of the conveyor screw or worm 4a in the first extraction tower be located at a substantial distance beneath the surface of the liquid therein which in the illustrated embodiment is about three feet. By this arrangement, the pressure of the column of liquid is sufficient to displace air entrapped between and surrounding the slices in the hollow shaft prior to their being discharged therefrom so that a pure mixture of slices and liquid is delivered to the large conveyor screw 4a. If desired, raw juice may be added to the slices on their way through the hollow shaft so as to make the displacement of air even more complete. In such case, the distance between the first canal of the large conveyor worm 4a and the surface of the liquid can be shortened, thus increasing the space available for the extraction process.

The arrows in Figs. 2 and 3 indicate the manner in which the slices are discharged from the opening 11 in the hollow shaft 9 against the movement of the conveyor screw 4a. The top of the first canal of the large conveyor screw 4a may be punched or perforated, as indicated at 16, to provide openings or sieves which permit the extracting liquid to flow upward and achieve a clear partition of the slices and the raw juices at the top of the first tower. Such an arrangement makes it possible to dispense with the filter-strainers formerly required to separate the juices from the beet slices.

The extraction of sugar from sugar beet slices is made more economical by the present invention which provides a definitely even and perfect distribution of the slices as they are introduced into the first extraction tower. The present invention also enables the correct proportion between the amount of liquid and the quantity of beets in the extraction towers to be consistently maintained and this is of the greatest importance to the economical operation of the extraction apparatus as the extent to which the sugar in the beet slices is exhausted and consequently, the output of the sugar depends on it.

It will be understood that various changes and modifications may be made in the embodiment of the invention illustrated and described herein without departing from the scope of the invention as defined by the following claims.

I claim:

1. In a device for extracting sugar from sugar beet slices wherein slices of sugar beets are moved through an extraction tower in a direction countercurrent to the flow of an extracting liquid in said tower by a rotatable conveyor screw mounted on a shaft within the tower characterized by the upper end of said conveyor screw shaft being hollow from a point above the level of the liquid in the tower to a point beneath the level of the liquid in the tower, said hollow portion of the shaft having an opening therein above the level of the liquid for receiving slices of beets and an outlet located beneath the level of the liquid, said outlet being located within the first canal of the conveyor screw for discharging slices of beets from the hollow shaft onto the conveyor screw.

2. In a device for extracting sugar from sugar beet slices as defined in claim 1 wherein the upper surface of the portion of the conveyor screw defining the first canal of the conveyor screw is perforated.

3. In a device for extracting sugar from sugar beet slices as defined in claim 1 wherein the first canal of the conveyor screw is located at a substantial distance beneath the level of the liquid in the tower, said distance being sufficient for the pressure of the liquid in the hollow portion of the shaft above the first canal of the conveyor screw to expel air surrounding slices of beets passing therethrough.

4. In a device for extracting sugar from sugar beet slices wherein slices of sugar beets are moved through an extraction tower in a direction countercurrent to the flow of an extracting liquid in said tower by a rotatable conveyor screw mounted on a shaft within the tower characterized by the upper end of said conveyor screw shaft being hollow from a point above the level of the liquid in the tower to a point beneath the level of the liquid in the tower, said hollow portion of the shaft having an opening therein above the level of the liquid for receiving slices of beets and an outlet located beneath the level of the liquid, said outlet being located within the first canal of the conveyor screw and means located at said outlet for distributing the slices of beets discharged from the outlet onto the conveyor screw.

5. In a device for extracting sugar from sugar beet slices as defined in claim 4 wherein the upper surface of the portion of the conveyor screw defining the first canal of the conveyor screw is perforated.

6. In a device for extracting sugar from sugar beet slices wherein slices of sugar beets are moved through an extraction tower in a direction countercurrent to the flow of an extracting liquid in said tower by a rotatable conveyor screw mounted on a shaft within said tower characterized by the shaft supporting the conveyor screw being hollow at its upper end with an opening therein for receiving slices of beets, said hollow portion extending above the level of the liquid in the tower and having an outlet therein below the level of the liquid in the tower, said outlet being located within the first canal of the conveyor screw and feed means located within the hollow portion of the shaft for forcibly feeding slices of beets from the opening in said shaft to the outlet therein and onto the conveyor screw.

7. In a device for extracting sugar from sugar beet slices as defined in claim 6 which includes means for driving said feed means independently of the conveyor screw in the tower.

8. In a device for extracting sugar from sugar beet slices as defined in claim 6 wherein the upper surface of the portion of the conveyor screw defining the first canal thereof is perforated.

9. In a device for extracting sugar from sugar beet slices, the combination as defined in claim 6 wherein the first canal of the conveyor screw is located at a substantial distance beneath the level of the liquid in the tower, said distance being sufficient for the pressure of the liquid in the hollow portion of the shaft above the first canal of the conveyor screw to expel air surrounding slices of beets passing therethrough.

10. In a device for extracting sugar from sugar beet slices wherein slices of sugar beets are moved through an extraction tower in a direction countercurrent to the flow of an extracting liquid in said tower by a rotatable conveyor screw mounted on a shaft within said tower characterized by the shaft supporting said conveyor screw being hollow at its upper end with an opening therein for receiving slices of beets, said hollow portion of the shaft extending above the level of the liquid in the tower and having an outlet therein below the level of the liquid in the tower, said outlet being located within the first canal of the conveyor screw, and a second conveyor screw rotatably mounted within the hollow portion of said shaft, said last-mentioned conveyor screw extending from the end of said hollow shaft to the outlet therein and forcibly feeding the slices of beets through the hollow shaft and the outlet therein to the conveyor screw in a continuous flow at a regulated rate.

11. In a device for extracting sugar from sugar beet slices as defined in claim 10 which includes means located at the outlet of the hollow shaft for distributing the slices of beets discharged from the outlet on the conveyor screw.

12. In a device for extracting sugar from sugar beet slices as defined in claim 10 wherein the upper surface of the conveyor screw defining the first canal therein is perforated.

13. In a device for extracting sugar from sugar beet slices wherein slices of sugar beets are moved through an extraction tower in a direction countercurrent to the flow of an extracting liquid in said tower by a rotatable conveyor screw mounted on a shaft within said tower characterized by the shaft supporting said conveyor screw being hollow at its upper end with an opening therein for receiving slices of beets, said hollow portion extending above the level of the liquid in the tower and having an outlet therein located below the level of the liquid in the tower, said outlet being located within the first canal of the conveyor screw, a second conveyor screw rotatably mounted within the hollow portion of said shaft for forcibly feeding the slices of beets through the hollow shaft and through the outlet therein and a baffle plate extending outwardly from the shaft at the outlet for distributing the slices of beets on the conveyor screw in the tower.

14. In a device for extracting sugar from sugar beet slices as defined in claim 13 wherein the upper surface of the portion of the conveyor screw defining the first canal therein is perforated.

EUGEN LANGEN.

REFERENCES CITED

The following references are of record in the file of this patent:

UNITED STATES PATENTS

| Number | Name | Date |
|---|---|---|
| 2,043,409 | Heitmann | June 9, 1936 |

FOREIGN PATENTS

| Number | Country | Date |
|---|---|---|
| 85,140 | France | Apr. 3, 1869 |
| 645,086 | France | June 25, 1928 |